(12) United States Patent
Zheng (10) Patent No.: US 9,778,680 B2
(45) Date of Patent: Oct. 3, 2017

(54) ELECTRONIC DEVICE

(71) Applicant: Lenovo (Beijing) Co., Ltd., Beijing (CN)

(72) Inventor: Yimin Zheng, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 150 days.

(21) Appl. No.: 14/181,178

(22) Filed: Feb. 14, 2014

(65) Prior Publication Data

US 2015/0055012 A1 Feb. 26, 2015

(30) Foreign Application Priority Data

Aug. 21, 2013 (CN) .......................... 2013 1 0367747

(51) Int. Cl.
*G06F 1/16* (2006.01)
*H04N 5/225* (2006.01)

(52) U.S. Cl.
CPC ............ *G06F 1/1601* (2013.01); *G06F 1/166* (2013.01); *G06F 1/1626* (2013.01); *H04N 5/2252* (2013.01)

(58) Field of Classification Search
CPC .... G06F 1/1605; G06F 1/1622; G06F 1/1626; G06F 1/166; G06F 1/1615; H04N 5/2252
USPC .............. 361/679.21, 679.26, 679.3, 679.44
See application file for complete search history.

(56) References Cited

U.S. PATENT DOCUMENTS

D656,137 S * 3/2012 Chung .......................... D14/341
D690,692 S * 10/2013 Shin ............................. D14/341
8,824,134 B2 9/2014 Chu et al.
D714,784 S * 10/2014 Park ............................. D14/341
D724,582 S * 3/2015 Kim ............................. D14/341
(Continued)

FOREIGN PATENT DOCUMENTS

CN 2648490 Y 10/2004
CN 102467171 A 5/2012
(Continued)

OTHER PUBLICATIONS

First German Office Action regarding Application No. 10 2014 202 881.7 dated Oct. 7, 2015. English translation provided by Unitalen Attorneys at Law.
(Continued)

*Primary Examiner* — Hoa C Nguyen
*Assistant Examiner* — Christopher L Augustin
(74) *Attorney, Agent, or Firm* — Harness, Dickey & Pierce, P.L.C.

(57) ABSTRACT

An electronic device is provided for solving a technical problem existed in the prior art that an electronic device is incapable of supporting itself independently. The electronic device includes a first component including a display unit, where the display unit is arranged on a first surface of the first component; and a second component including a connecting member and a supporter, where the second component is arranged at a first side portion of the first component. The supporter is movable with respect to the first component via the connecting member, and when the supporter moves to a first relative position with respect to the first component, the supporter may be used to support the first component.

25 Claims, 7 Drawing Sheets

(56) References Cited

U.S. PATENT DOCUMENTS

| | | | | |
|---|---|---|---|---|
| 2003/0160892 A1* | 8/2003 | Tamura | ................ | H04N 5/2251 348/333.07 |
| 2006/0097988 A1* | 5/2006 | Hong | ................ | G06F 17/30274 345/168 |
| 2006/0139863 A1* | 6/2006 | Lin | ................ | G06F 1/1616 361/679.27 |
| 2008/0017713 A1* | 1/2008 | Lapstun | ................ | G06F 1/1626 235/454 |
| 2008/0068786 A1* | 3/2008 | Cheng | ................ | G06F 1/1613 361/679.01 |
| 2009/0278974 A1* | 11/2009 | Kuwahara | ................ | G03B 29/00 348/333.06 |
| 2012/0106047 A1* | 5/2012 | Chu | ................ | G06F 1/166 361/679.01 |
| 2012/0194998 A1* | 8/2012 | McClure | ................ | H01Q 1/243 361/679.56 |
| 2013/0176681 A1* | 7/2013 | Lee | ................ | G06F 1/1626 361/679.55 |
| 2014/0029187 A1* | 1/2014 | Okuley | ................ | G06F 1/1616 361/679.09 |
| 2014/0285960 A1* | 9/2014 | Sharma | ................ | G06F 1/1654 361/679.28 |
| 2015/0193009 A1* | 7/2015 | Sharma | ................ | G06F 1/1616 345/169 |
| 2015/0207963 A1* | 7/2015 | Sayag | ................ | G03B 15/05 348/376 |

FOREIGN PATENT DOCUMENTS

| | | |
|---|---|---|
| CN | 202939541 U | 5/2013 |
| WO | WO-2013105719 A1 | 7/2013 |

OTHER PUBLICATIONS

First Chinese Office Action regarding Application No. 201310367747.6 dated Apr. 19, 2017. English translation provided by http://globaldossier.uspto.gov.

* cited by examiner

ELECTRONIC DEVICE

The present application claims the priority to Chinese Patent Application No. 201310367747.6, entitled as "ELECTRONIC DEVICE", filed on Aug. 21, 2013 with State Intellectual Property Office of PRC, which is incorporated herein by reference in its entirety.

TECHNICAL FIELD

The present disclosure relates to the electronic technology, and particularly, to an electronic device.

BACKGROUND

With the development of technology, more and more electronic devices come into lives of people, such as Smartphones, Tablet PCs, Laptops, Smart TVs, etc. These electronic devices have brought great convenience to lives of people.

Currently, taking Tablet PCs for example, most of the Tablet PCs on the market tend to have same product functions and forms. The Tablet PCs, designed with emphasis on recreation, are generally used to browse web pages, watch videos, read books, and play games. In order to meet various user demands, a user, when using a Tablet PC, may support the electronic device with a holder so as to place the electronic device on a plane at various angles.

However, the inventors of the present application, during implementation of technical solutions according to embodiments of the present disclosure, found at least the following technical problem in the foregoing technique.

As the electronic device needs to rely on an external holder to be placed on a plane at various angles, the electronic device may be only laid on the desktop or be held by a user with hand(s) if there is no holder. The electronic device is incapable of supporting itself independently, so there is a technical problem that the electronic device is incapable of supporting itself independently.

SUMMARY

The disclosure provides an electronic device, for solving the technical problem in the prior art that an electronic device is incapable of supporting itself independently, and a new form electronic device capable of supporting itself independently is provided.

In one aspect, an electronic device is provided according to an embodiment of the disclosure. The electronic device includes: a first component including a display unit, where the display unit is arranged on a first surface of the first component; and a second component including a connecting member and a supporter, where the second component is arranged at a first side portion of the first component. The supporter is movable with respect to the first component via the connecting member, and when the supporter moves to a first relative position with respect to the first component, the supporter may be used to support the first component.

Optionally, the first side portion includes a first end portion and a second end portion, the first end portion is provided with a first sub connecting portion and the second end portion is provided with a second sub connecting portion; the connecting member is connected to the first component via the first sub connecting portion and the second sub connecting portion.

Optionally, the first sub connecting portion and the second sub connecting portion are respectively sleeved on the connecting member, such that the connecting member is rotatable in the first sub connecting portion and the second sub connecting portion, thereby the supporter is driven to move with respect to the first component.

Optionally, the first sub connecting portion and the second sub connecting portion are through holes or cavities, and the connecting member is a rotating shaft.

Optionally, in the case that the first sub connecting portion and the second sub connecting portion are through holes, at least one input and output component is arranged on an end surface of the connecting member.

Optionally, in the case that the first sub connecting portion and the second sub connecting portion are cavities, at least one input and output component is arranged on the first component, and the at least one input and output component is concentric with the connecting member.

Optionally, the at least one input and output component is arranged at the first end portion of the first side portion of the first component and/or the second end portion of the first side portion of the first component.

Optionally, the at least one input and output component may be any one of or any combination of key, indicator light, loudspeaker, camera and interface.

Optionally, an exterior surface of the first end portion and the first side surface of the first component are at an angle.

Optionally, the angle is bigger than a threshold, such that the exterior surface of the first end portion, an exterior surface of the second end portion and the second surface of the first component may be simultaneously viewed by the user, where the second surface is opposite to the first face.

Optionally, the first side portion is provided with a first input unit.

Optionally, the connecting portion and the supporter are integrally formed.

Optionally, the connecting member is a rotating shaft, and the supporter is sleeved on the connecting member.

Optionally, the connecting member is a damping rotating shaft which allows the supporter to be held and fixed when the supporter rotates to a first relative position with respect to the first component.

Optionally, at least one surface of the supporter is a curved surface.

Optionally, the supporter is provided with a second input unit.

Optionally, at least one cavity is provided in the connecting member, where the at least one cavity is for accommodating a battery of the electronic device.

Optionally, the battery is a cylindrical battery.

Optionally, the first component further includes a second side portion, the second side portion is opposite to the first side portion; the thickness of the first component tapers in a direction from the first side portion to the second side portion.

Optionally, at least one first functional component is provided in the first component, and the at least one first functional component is arranged at a position close to the first side portion, such that the thickness of the first component tapers in the direction from the first side portion to the second side portion.

Optionally, the electronic device further includes a fixing unit for fixing or hanging the electronic device.

Optionally, the fixing unit is a hole arranged on the supporter.

Optionally, the first component has a second surface opposite to the display unit, the second surface is provided with a groove for accommodating the supporter.

Optionally, the bottom of the first groove is at least provided with a second groove for accommodating a smart card for achieving functions of communication or storage, or a stylus.

Optionally, the first component is further provided with a first image capturing unit, the first image capturing unit is arranged at the first side portion and the first image capturing unit is arranged on the second face.

Optionally, the first component is further provided with a second image capturing unit, the second image capturing unit is arranged at a third side portion of the first component and the second image capturing unit is arranged on the first surface, where the third side portion is different from the first side portion and the second side portion.

Optionally, the first component is further provided with an audio output unit, the audio output device is arranged at the first side portion and the audio output device is arranged on the first face.

In another aspect, an electronic device is provided according to another embodiment of the disclosure. The electronic device includes: a first component including a display unit, a first side portion and a second side portion, where the display unit is arranged on the first surface of the first component, and the second side portion is opposite to the first side portion. The electronic device further includes a second component including a connecting member and a supporter, the second component is arranged at the first side portion. The electronic device has at least a first operation mode and a second operation mode. When the electronic device is in the first operation mode, the electronic device is supported by the supporter and the second side portion. When the electronic device is in a second operation mode, the electronic device is supported by the supporter and the first side portion.

Optionally, the electronic device further has a third operation mode, where the third operation mode is different from the first operation mode and the second operation mode. When the electronic device is in the third operation mode, the electronic device is supported by the first side portion and the second side portion.

One or more technical solutions according to the disclosure may have at least the following technical effects or advantages.

A first side portion of a first component of an electronic device is provided with a second component; the second component includes a connecting member and a supporter; the supporter is movable with respect to the first component via the connecting member, and accordingly a relative position between the supporter and the first component may change; and when the supporter moves to a first relative position with respect to the first component, the supporter supports the first component. Hence, the electronic device supports itself independently, the technical problem existed in the prior art that an electronic device is incapable of supporting itself independently is effectively solved, an electronic device capable of supporting itself independently is provided and user experience is accordingly improved.

DETAILED DESCRIPTION OF THE EMBODIMENTS

An electronic device is provided according to embodiments of the disclosure to solve the technical problem existed in the prior art that an electronic device is incapable of supporting itself independently.

For solving the existed problem that the electronic device is incapable of supporting itself, technical solutions according to the embodiments of the disclosure have a general idea as follows.

A first side portion of a first component of an electronic device is provided with a second component including a connecting member and a supporter; the supporter is movable with respect to the first component via the connecting member, accordingly a relative position between the supporter and the first component may change; and when the supporter moves to a first relative position with respect to the first component, the supporter supports the first component. Hence, the electronic device supports itself independently, the technical problem existed in the prior art that an electronic device is incapable of supporting itself independently is effectively solved, an electronic device capable of supporting itself independently is provided and accordingly user experience is improved.

The technical solutions of the disclosure are described in detail in conjunction with drawings and the embodiments. It is to be understood that, the embodiments of the disclosure and features in the embodiments are detail illustrations rather than limitations of the technical solutions of the disclosure, and the embodiments and technical features in the embodiments may be combined if no conflict may be caused.

Figure 1A:
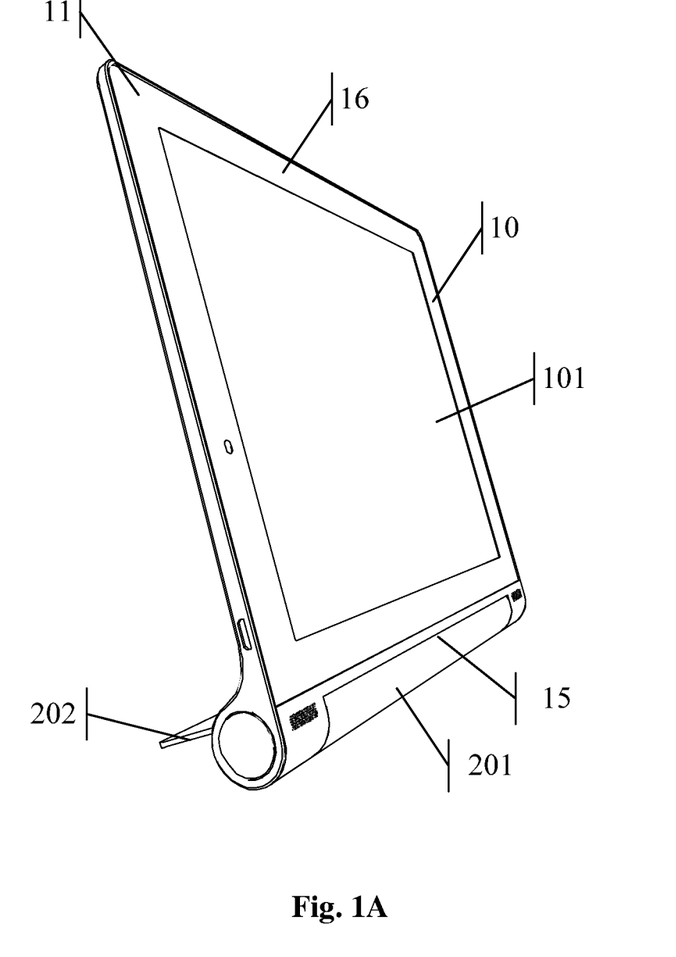
FIGS. 1A and 1B are oblique views of an electronic device according to an embodiment of the disclosure.

In one aspect, an electronic device is provided according to an embodiment of the disclosure. The electronic device may be a tablet device such as Tablet PC, Smartphone, Multimedia Player, etc. FIG. 1A is an oblique view of the electronic device. As shown in FIG. 1, the electronic device includes: a first component 10 including a display unit 101, where the display unit 101 is arranged on a first surface 11 of the first component; and a second component including a connecting member 201 and a supporter 202, where the second component is arranged at a first side portion 15 of the first component 10. The supporter 202 is movable with respect to the first component 10 via the connecting member 201, and when the supporter 202 moves to a first relative position with respect to the first component 10, the supporter 202 may be used to support the first component 10.

Firstly the second component is described hereinafter.

According to the embodiment, as shown in FIG. 1A, the second component includes the connecting member 201 and the supporter 202. The connecting member 201 and the supporter 202 may be integrally formed. Alternatively, the supporter 202 may be sleeved on the connecting member 201, and the supporter 202 and the connecting member 201 are fixedly connected, that is, when the connecting member 201 moves, the supporter 202 is accordingly driven to move.

Figure 2A:
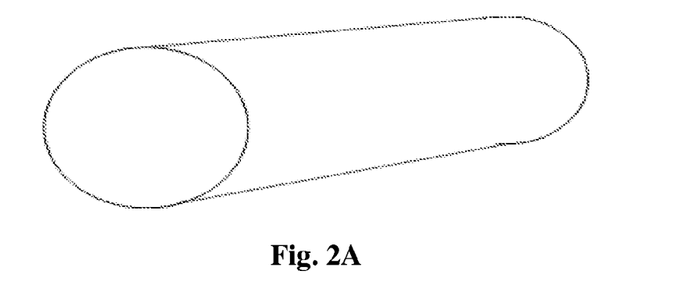
FIGS. 2A and 2B are structure diagrams of a connecting member according to an embodiment of the disclosure.
Figure 2B:
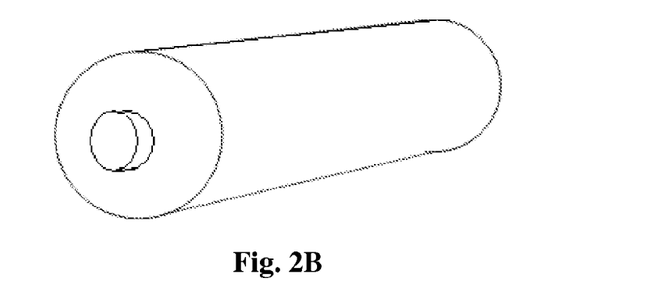

According to the embodiment, the connecting member 201 may be a rotating shaft as shown in FIG. 2A. Alternatively the connecting member 201 may include multiple rotating shafts with various diameters as shown in FIG. 2B. When the supporter 202 moves to the first relative position respect to the first component 10, in order that the supporter 202 may support the first component 10 by remaining in that position, the connecting member 201 may be a damping rotating shaft, and accordingly, the supporter 202 may remain in any position to support the first component 10.

Furthermore, at least one cavity may be provided in the connecting member 201 and the at least one cavity is for accommodating a battery for the electronic device. Apparently, the at least one cavity may also be used to accommodate, for example, wires on the main board or a functional module occupying much space, which is not limited in the disclosure. If a battery is accommodated in the connecting member 201, the battery may be a cylindrical battery to be adapted to the at least one cavity in the connecting member 201.

Figure 3A:
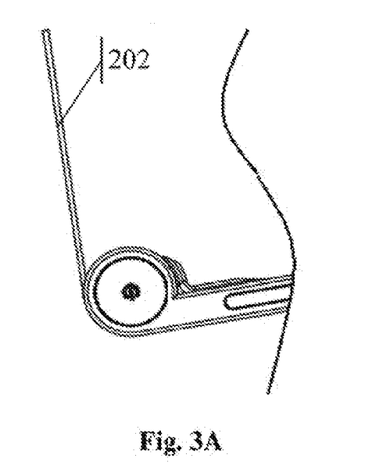
FIGS. 3A and 3B are structure diagrams of a supporter according to an embodiment of the disclosure.
Figure 3B:
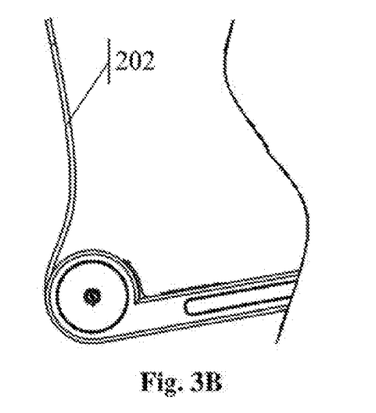

According to the embodiment, at least one surface of the supporter 202 may be a plane as shown in FIG. 3A (other functional component(s) is on the right side of the curved line), alternatively, the at least one surface of the supporter 202 may be a curved surface as shown in FIG. 3B (other functional component(s) is on the right side of the curved line). In the case that the at least one surface of the supporter 202 is the curved surface, if the supporter 202 is placed on a plane, for example, on a desk, there are at least two contact surfaces by which the supporter 202 contacts the desk, here the supporter 202 provides larger supporting force to the first component 10.

According to another embodiment, the supporter 202 may be provided with a second input unit such as keyboard, touchpad, etc. When a user rotates the supporter 202 around the connecting member 201 to make the supporter 202 close to the first surface 11 of the first component without shading the display unit 101, that is, when the supporter 202 and the first component 10 form an 'L' shape, the user may perform inputting via the second input unit. Or when the user rotates the supporter 202 to abut against the first surface 11 and the supporter 202 may shade part of the display unit 101, the user may perform inputting via the second input unit.

Then the first component 10 is described hereinafter.

Figure 4A:
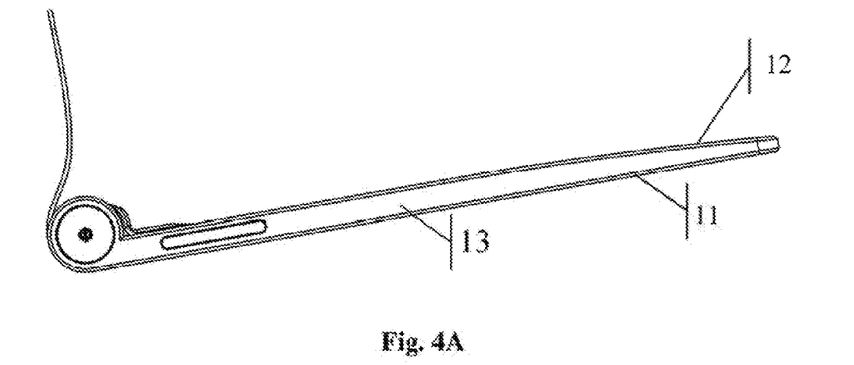
FIGS. 4A and 4B are side views of an electronic device according to an embodiment of the disclosure.
Figure 4B:
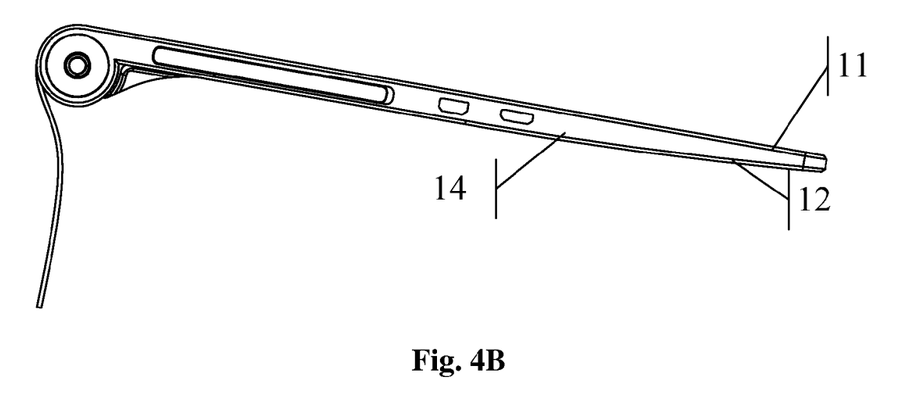

FIG. 4A is a left side view of the electronic device. As shown in FIG. 4A, the first component 10 further includes a second surface 12 facing the first surface 11. The second surface 12 may be a back board of the electronic device. Furthermore, in conjunction with FIG. 4B, a right side view of the electronic device, the first component 10 further includes at least two side surfaces between the first surface 11 and the second surface 12. The at least two side surfaces are respectively a first side surface 13 and a second side surface 14 located opposite to each other.

Figure 5:
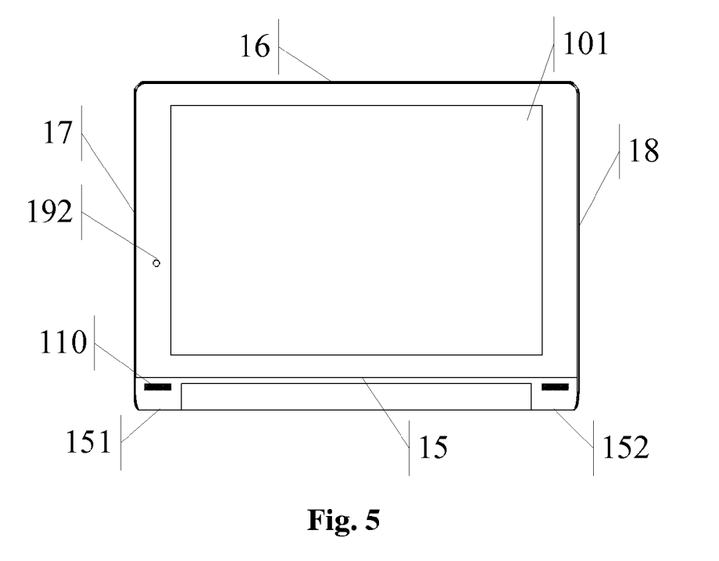
FIG. 5 is a front view of an electronic device according to an embodiment of the disclosure.

FIG. 5 is a front view of the electronic device. According to the embodiment, as shown in FIG. 5, when the user normally uses the electronic device, i.e., when the display unit 101 faces the user, the first side portion 15 is a side portion of the first component 10 and the first side portion 15 contacts with a supporting surface such as a desk surface. In practice, the display unit 101 may be a common LED display screen, or a touch display screen, or a flexible screen, etc., so long as the display unit 101 has display function, which is not limited in the disclosure. The first component 10 further includes a second side portion 16, a third side portion 17 and a fourth side portion 18. The second side portion 16 is opposite to the first side portion 15, and the third side portion 17 is opposite to the fourth side portion 18, the third side portion 17 is at the same side as the first side surface 13, and the fourth side portion 18 is at the same side as the second side surface 14. Apparently, in practice, the third side portion 17 may alternatively be located at the right side of the first component 10, that is, the positions of the third side portion 17 and the fourth side portion 18 may be interchanged with each other, which is not limited in the disclosure.

According to another embodiment, the first side portion 15 may further be provided with a first input unit such as roller, touchpad, small touch display screen, etc. By performing operation on the first input unit, the user may control the electronic device to achieve functions such as paging up and down, adjusting the volume, switching displayed contents by swiping to the left or right, zooming, etc. Apparently, the first input unit may alternatively be arranged on the connecting member, which is not limited in the disclosure.

Furthermore, as shown in FIG. 5, the first side portion 15 includes a first end portion 151 and a second end portion 152. The first end portion 151 is provided with a first sub connecting portion and the second end portion 152 is provided with a second sub connecting portion. The connecting member 201 is connected to the first component 10 via the first sub connecting portion and the second sub connecting portion.

The first sub connecting portion and the second sub connecting portion are respectively sleeved on the connecting member 201, such that the connecting member 201 is rotatable in the first sub connecting portion and the second sub connecting portion, thereby driving the supporter 202 to move with respect to the first component 10.

During implementation, the first sub connecting portion and the second sub connecting portion may be through holes or cavities. According to the embodiment, the connecting member 201 is a rotating shaft. The connecting member 201 may be a damping rotating shaft, and consequently, the supporter 202 may be held and fixed when the supporter 202 rotates to a first relative position with respect to the first component 10. For example, when the supporter 202 rotates to a position where the supporter 202 and the first component 10 are at an angle of 60 degrees, the supporter 202 and the first component 10 may be held in that position with the connecting member 201, i.e., the damping rotating shaft.

According to another embodiment, the first component 10 further includes at least one input and output component; the at least one input and output component may be any one of or any combination of key, indicator light, loudspeaker, camera and interface.

During implementation, one or more input and output components in the at least one input and output component may be arranged in the following two ways and the arrangement is not limited to the two ways.

Figure 6A:
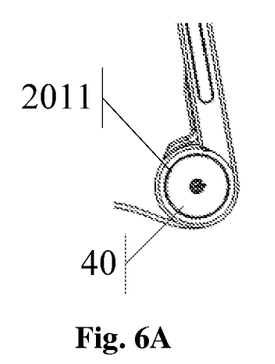
FIGS. 6A and 6B are side views of a first end portion according to an embodiment of the disclosure.

A first way for arranging the one or more input and output components is described as follows. In the case that the first sub connecting portion and the second sub connecting portion are through holes, the two ends of the connecting member 201 respectively pass through the first sub connecting portion and the second sub connecting portion, such that end surfaces of both ends of the connecting member 201 are exposed. Here, as shown in FIG. 6A, a side view of the first end portion, the at least one input and output component 40 is arranged on an end surface 2011 of the connecting member 201. Apparently, the at least one input and output component 40 may alternatively be provided on an end surface opposite to the end surface 2011, i.e., on an end surface 2012 of the connecting member 201, where the end surface 2012 is at the same side as the second end portion 152.

Figure 6B:
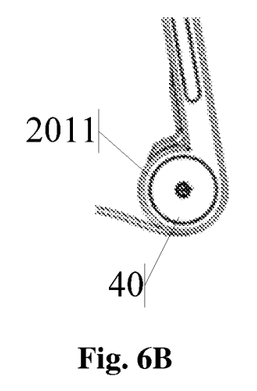

A second way for arranging the one or more input and output components is described as follows. In the case that the first sub connecting portion and the second sub connecting portion are cavities, the two ends of the connecting member 201 are respectively accommodated in the first sub connecting portion and the second sub connecting portion. Here, as shown in FIG. 6B, a side view of the first end portion, the at least one input and output component 40 is arranged on the first component 10, and the at least one input and output component 40 is concentric with the connecting member 201. For example, if the at least one input and output component 40 is a circular key, the circular key and the connecting member 201 are arranged with shapes similar to concentric circles. Apparently, if the at least one input and output component 40 is square, the square key and the connecting member 201 are also arranged to with shapes concentric with each other.

Optionally, the at least one input and output component 40 is arranged at the first end portion 151 of the first side portion 15 of the first component 10, or at the second end portion 152 of the first side portion 15 of the first component 10, or at both the first end portion 151 and the second end portion 152.

In practice, the at least one input and output 40 such as USB interface, earphone interface, data line interface, etc., may alternatively be arranged on the third side surface 13 or the fourth side surface 14 of the first component 10.

According to the embodiment, for moving the center of gravity of the first component 10 downwards to make the supporter 202 to support the first component 10 more stably, as shown in FIG. 4A, the side view of the electronic device, the thickness of the first component 10 tapers in a direction from the first side portion 15 to the second side portion 16, that is, the thickness of the first component 10 is reduced gradually from down to up and the first component 10 is accordingly formed in a wedge shape.

Correspondingly, for reducing the thickness of the second side portion 16, at least one first functional component, for example, an element occupying large space such as main board, CPU, camera module, loudspeaker, sound card, display card, etc., is arranged at a position close to the first side portion 15, in this way, the thickness of the first component 10 may be gradually reduced from the first side portion 15 to the second side portion 16.

Figure 7:
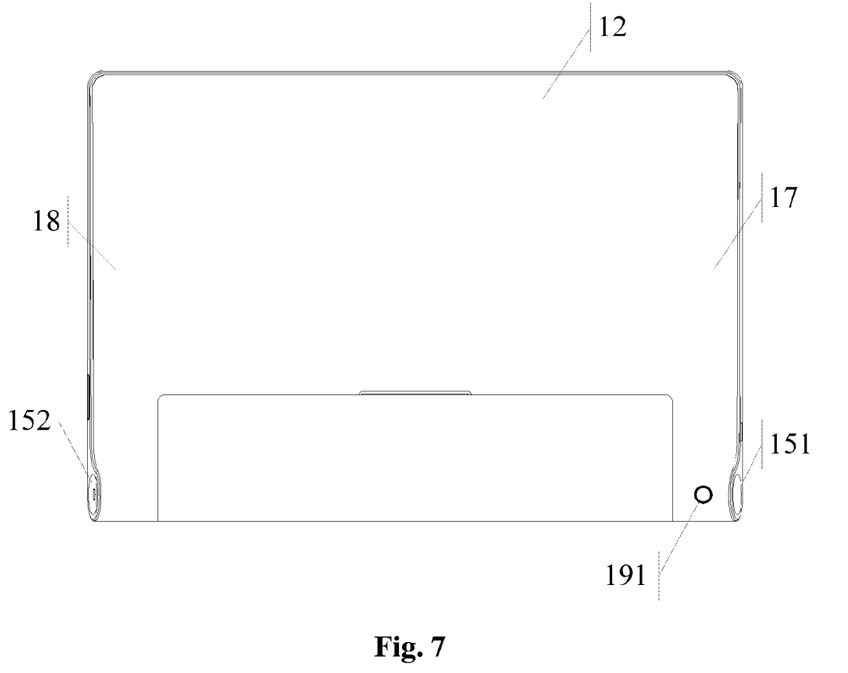
FIG. 7 is a rear view of an electronic device according to an embodiment of the disclosure.

Furthermore, for moving the center of gravity of the whole electronic device downwards and backwards to allow the supporter 202 to support the first component 10 more stably, as shown in FIG. 7, a rear view of the first component 10, an exterior surface of the first end portion 151 and the first side surface 13 of the first component 10 are at an angle. Apparently, an exterior surface of the second end portion 152 and the second side surface 14 of the first component 10 are also at an angle and the second side surface 14 is symmetric to the first side surface 13. The angle may be bigger than a threshold such as 3 degrees, 5 degrees, 10 degrees, etc. Here, as shown in FIG. 7, the rear view of the electronic device, the exterior surface of the first end portion 151, the exterior surface of the second end portion 152, and the second surface 12 of the first component 10 may be viewed simultaneously by the user.

Figure 1B:
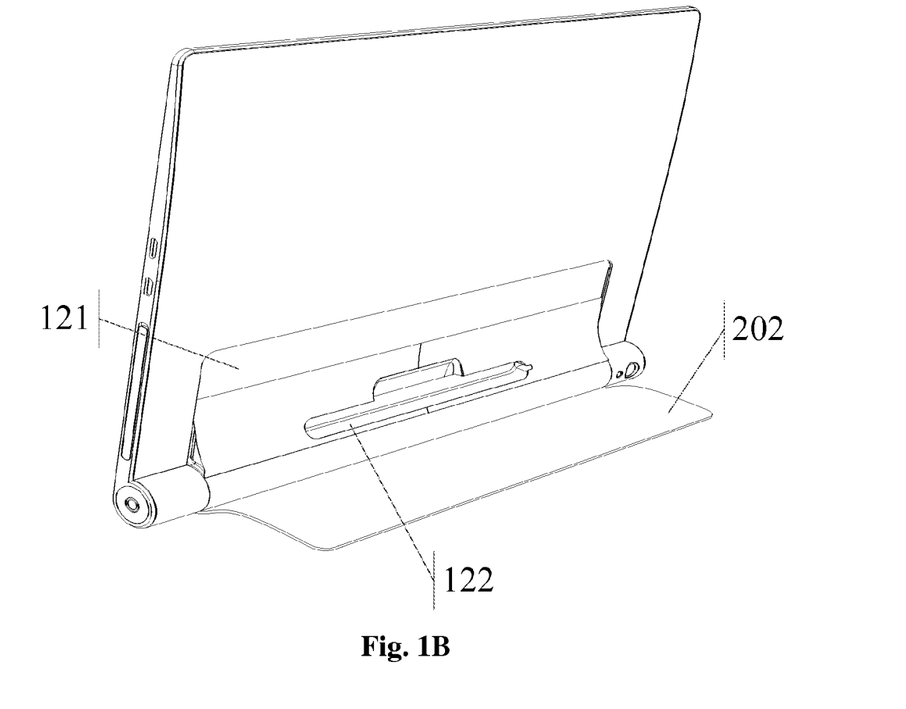

Furthermore, as shown in FIG. 1B, the oblique view of the electronic device, the second surface 12 of the first component 10 is provided with a first groove 121, where the first groove 121 may be used to accommodate the supporter 202. When the supporter 202 is completely embedded into the second surface 12, the supporter 202 and the second surface 12 form an integral surface.

During implementation, a second groove 122 may further be provided at the bottom of the first groove 121 and the second groove 122 is for accommodating a smart card for achieving functions of communication or storage and/or a stylus, for example, accommodating a stylus, an SIM card, an SD card, a memory stick. In practice, the second groove 122 may be a groove having any shape, or the second groove 122 may be a groove having a shape exactly adapted to the shape of the foregoing smart card or stylus. In this way, if the smart card or stylus is placed in the second groove 122, the smart card or stylus may be fixed within the second groove 122. Hence, the smart card or stylus may not generate noise due to shake caused by the user shaking the electronic device during use, and the smart card or stylus may not get lost because the supporter 202 is open when the supporter 202 supports the first component 10.

Furthermore, to meet recreation requirements of the user, the first component 10 may further include at least one image capturing unit. For example, as shown in FIG. 7, the first component 10 is provided with a first image capturing unit 191 and the first image capturing unit 191 is a rear camera. The first image capturing device 191 is arranged on the second surface 12 of the first component 10, and at the same time, for ensuring the thickness of the second side portion 16 of the electronic device as small as possible, the first image capturing device 191 is arranged at the first side portion 15. The electronic device may further include a front camera, then the first component 10 may further be provided with a second image capturing unit. As shown in FIG. 5, the second image capturing device 192 is arranged on the first surface 11, however, since there are many functional components arranged at the first side portion 15 of the first component 10, while the thickness of the second side portion 16 should be as small as possible, the second image capturing device 192 is arranged at the third side portion 17 of the first component 10. Here, as shown in FIG. 5, the second image capturing unit 192 is located at the third side portion 17, that is, the left side of the first component 10. Apparently, if the third side portion is located at the right side of the first component 10, the second image capturing unit 192 is arranged at the right side of the first component. Location of the second image capturing unit 192 is not limited in the disclosure as long as the second image capturing unit 192 is not arranged at the first side portion 15 or the second side portion 16.

Furthermore, for increasing recreation functions of the electronic device, as shown in FIG. 5, the first component 10 may also be provided with an audio output unit 110, that is, a loudspeaker. The audio output device 110 is arranged at the first side portion 15 and the audio output device 110 is arranged on the first surface 11. An audio output unit 110 may be provided at each of the first end portion 151 of the first side portion 10 and the second end portion 152 of the first side portion 10, and accordingly the user may acquire good sound experience.

According to another embodiment, the electronic device further includes a fixing unit for fixing or hanging the electronic device on a plane. The fixing unit may be a fixing hole on the second surface 12 or a fixing hole on the supporter 202. In the case that the fixing unit is a fixing hole on the supporter 202, the user may hang the supporter on a plane via the fixing hole, for example, the user may hang the supporter on a wall, and the electronic device may change a display direction of the display unit 101 according to the posture of the electronic device at that time. For example, when the first component 10 is supported by the supporter 202, the display direction of the display unit 101 is from the second side portion 16 to the first side portion 15, and when the electronic device is hung on the wall via the fixing hole, the display direction of the display unit 101 is from the first side portion 15 to the second side portion 16.

Operation processes of the electronic device according to the above one or more embodiments are described hereinafter.

The electronic device has the following three operation modes and operation modes of the electronic device are not limited to the three operation modes.

Figure 8A:
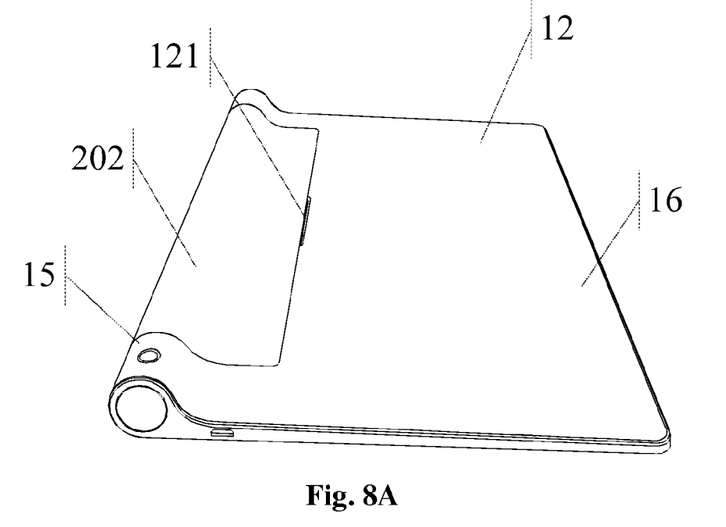
FIG. 8A is a schematic view showing a form of an electronic device according to an embodiment of the disclosure in a tablet mode.

A first operation mode is a tablet mode. As shown in FIG. 8A, in this operation mode, the supporter 202 is embedded and stuck into the first groove 121, and the supporter 202 and the second surface 12 form an integral surface. Here, the user may hold the electronic device by hand(s) or place the electronic device on a plane just as using a common Tablet PC. When the electronic device is placed on a plane, the first side portion 15 and the second side portion 16 of the first component 10 together support the first component 10.

Figure 8B:
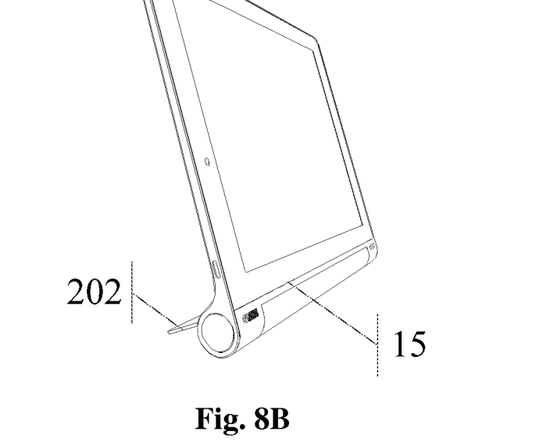
FIG. 8B is a schematic view showing a form of an electronic device according to an embodiment of the disclosure in a standing mode.

A second operation mode is a standing mode. As shown in FIG. 8B, when the user intends to switch use the electronic device from the tablet mode to the standing mode, the user is simply required to screw out the supporter 202 from the first groove 121, and via rotation of the connecting member 201, the supporter 202 is driven to rotate to a first relative position where the supporter 202 and the first component 10 are at an angle such as 60 degrees, and via a damping function of the connecting member 201, the first component 10 and the supporter 202 are held in that position. Here, the electronic device is in the standing mode, and the first component 10 is supported by the supporter 202 and the first side portion 15. Furthermore, the user may also adjust the angle between the supporter 202 and the first component 10 as required to improve user experience. In the standing mode, the user may use the electronic device to view videos, browse web pages, etc.

Figure 8C:
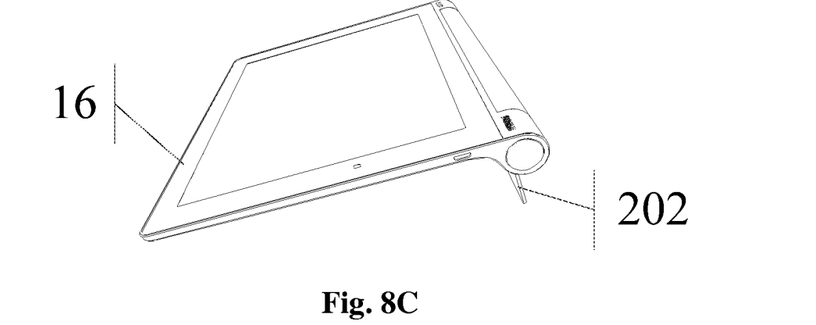
FIG. 8C is a schematic view showing a form of an electronic device according to an embodiment of the disclosure in an input mode.

And a third operation mode is an input mode. As shown in FIG. 8C, when the user intends to edit documents or input characters with the electronic device, for improving the efficiency of inputting, the user may typewrite on a virtual keyboard of the electronic device with both hands. Here, the user may place the first side portion 15 of the first component 10 at a position away from the user, and place the second side portion 16 at a position close to the user, and the first component 10 is supported by the supporter 202 and the second side portion 16. Furthermore, the electronic device may adjust the display direction of the display unit 101 according to conditions of the electronic device to facilitate the user to perform inputting. Apparently, when the electronic device is in this mode, the user may not perform inputting, the user may alternatively play games, for example, the user may play the piano, by knocking the keyboard with both hands. The electronic device may be in the input mode so long as the user operates the electronic device with both hands simultaneously.

As illustrated above, the second component is provided at the first side portion of the first component of the electronic device; the second component includes the connecting member and the supporter; the supporter is movable with respect to the first component via the connecting member and accordingly, the relative position between the supporter and the first component may change; when the supporter moves with respect to the first component to the first relative position, the supporter supports the first component. Hence, the electronic device supports itself independently, the technical problem in the prior art that an electronic device is incapable of supporting itself independently is effectively solved, an electronic device capable of supporting itself independently is provided and accordingly the user experience is improved.

In another aspect, an electronic device is provided according to another embodiment of the disclosure. The electronic device is same as the one described according to the above one or more embodiments. The electronic device may be a tablet device such as Tablet PC, Smartphone, Multimedia Player, etc. As shown in FIG. 1A, the electronic device includes a first component 10 including a display unit 101, a first side portion 15 and a second side portion 16, where the display unit 101 is arranged on a first surface 11 of the first component 10, the first side portion 15 and the second side portion 16 are located on two opposite sides of the first component 10; the electronic device further includes a second component including a connecting member 201 and a supporter 202, where the second component is arranged at the first side portion 15. The electronic device at least has a first operation mode and a second operation mode. When the electronic device is in the first operation mode, the electronic device is supported by the supporter 202 and the second side portion 16; and when the electronic device is in the second operation mode, the electronic device is supported by the supporter 202 and the first side portion 15.

Furthermore, the electronic device further has a third operation mode. The third operation mode is different from the first operation mode and the second operation mode. When the electronic mode is in the third operation mode, the electronic device is supported by the first side portion 15 and the second side portion 16.

According to the embodiment, the structure and shape of the electronic device are same as those of the electronic device according to the above one or more embodiments, which are repeated here.

Operation processes of the electronic device are described hereinafter.

First, as shown in FIG. 8A, when the electronic device is in the third operation mode, i.e., a tablet mode, the supporter 202 is embedded and stuck into the first groove 121, and the supporter 202 and the second surface 12 form an integral surface. Here, the user may hold the electronic device with the hand(s) or place the electronic device on a plane just as using a common Tablet PC. And when the electronic device is placed on a plane, the first side portion 15 and the second side portion 16 of the first component 10 together support the first component 10.

When the user intends to switch the electronic device from the tablet mode to a standing mode, the user is simply required to screw out the supporter 202 from the first groove 121, and via rotation of the connecting member 201, the supporter 202 is driven to rotate to a first relative position where the supporter 202 and the first component 10 are at an angle such as 60 degrees, and via a damping function of the connecting member 201, the first component 10 and the supporter 202 are held in that position. Here, as shown in FIG. 8B, the electronic device is in the second operation mode, i.e., the standing mode, the first component 10 is supported by the supporter 202 and the first side portion 15. In the standing mode, the user may use the electronic device to view videos, browse web pages, etc.

When the user intends to edit documents or input characters with the electronic device, for improving the efficiency of inputting, the user may typewrite on a virtual keyboard of the electronic device with both hands. Here, the electronic device further has the first operation mode. As shown in FIG. 8C, the user places the first side portion 15 of the first component 10 at a position away from the user and places the second side portion 16 at a position close to the user, and the first component 10 is supported by the supporter 202 and the second side portion 16. Furthermore, the electronic device may adjust a display direction of the display unit 101 according to conditions of the electronic device to facilitate the user to perform inputting.

The technical solutions according to the above embodiments of the disclosure have at least the following technical effects and advantages.

The second component is provided at the first side portion of the first component of an electronic device; the second component includes the connecting member and the supporter; the supporter is movable with respect to the first component via the connecting member and accordingly, the relative position between the supporter and the first component may change; and when the supporter moves to the first relative position with respect to the first component, the supporter supports the first component; hence, the electronic device supports itself independently, the technical problem existed in the prior art that an electronic device is incapable of supporting itself independently is effectively solved, and an electronic device capable of supporting itself independently is provided and accordingly the user experience is improved.

Apparently, various alterations and variations may be performed on the disclosure by those skilled in the art without departing from the spirit and scope of the disclosure. Hence, if those alterations and variations fall into the scope of claims and equivalent techniques of the disclosure, the disclosure intends to include all those alterations and variations.

The invention claimed is:

1. An electronic device comprising:
a first component comprising a display unit, wherein the display unit is arranged on a first surface of the first component; and
a second component comprising a connecting member and a supporter, wherein the second component is arranged at a first side portion of the first component;
wherein the supporter is movable with respect to the first component via the connecting member, and when the supporter moves to a first relative position with respect to the first component, the supporter supports the first component,
wherein at least one surface of the supporter is a curved surface, the first component has a second surface opposite to the display unit, and the second surface is provided with a groove for accommodating the supporter, the second surface of the first component has at least one curved surface, the curved surface of the supporter matches with the curved surface of the second surface such that when the supporter is accommodated in the groove, the curved surface of the second surface is flush with the curved surface of the supporter and the supporter occupies the entire groove such that the curved surface of the supporter and the curved surface of the second surface cooperate to form an integral curved surface that defines an entirety of a backside of the electronic device;
wherein the first component further comprises a second side portion opposite to the first side portion; and the thickness of the first component tapers in a direction from the first side portion to the second side portion; and
wherein the first component is further provided with a first image capturing unit, and the first image capturing unit is arranged at the first side portion and the first image capturing unit is arranged on the second surface.

2. The electronic device according to claim 1, wherein the first side portion comprises a first end portion and a second end portion, the first end portion is provided with a first sub connecting portion and the second end portion is provided with a second sub connecting portion; wherein the connecting member is connected to the first component via the first sub connecting portion and the second sub connecting portion.

3. The electronic device according to claim 2, wherein the first sub connecting portion and the second sub connecting portion are respectively sleeved on the connecting member, so that the connecting member is rotatable in the first sub connecting portion and the second sub connecting portion and the supporter is driven to move with respect to the first component.

4. The electronic device according to claim 2, wherein the first sub connecting portion and the second sub connecting portion are through holes or cavities, and the connecting member is a rotating shaft.

5. The electronic device according to claim 4, wherein in the case that the first sub connecting portion and the second sub connecting portion are through holes, at least one input and output component is arranged on an end surface of the connecting member.

6. The electronic device according to claim 4, wherein in the case that the first sub connecting portion and the second sub connecting portion are cavities, at least one input and output component is arranged on the first component, and the at least one input and output component is concentric with the connecting member.

7. The electronic device according to claim 6, wherein the at least one input and output component is arranged at the first end portion of the first side portion of the first component and/or the second end portion of the first side portion of the first component.

8. The electronic device according to claim 5, wherein the at least one input and output component is any one of or any combination of key, indicator light, loudspeaker, camera and interface.

9. The electronic device according to claim 2, wherein an exterior surface of the first end portion is arranged at an angle with respect to a first side surface of the first component.

10. The electronic device according to claim 9, wherein the angle is bigger than a threshold, and the exterior surface of the first end portion, an exterior surface of the second end portion and a second surface of the first component are simultaneously viewed by the user, wherein the second surface is opposite to the first surface.

11. The electronic device according to claim 1, wherein the first side portion is provided with a first input unit.

12. The electronic device according to claim 1, wherein the connecting portion and the supporter are integrally formed.

13. The electronic device according to claim 1, wherein the connecting member is a rotating shaft and the supporter is sleeved on the connecting member.

14. The electronic device according to claim 1, wherein the connecting member is a damping rotating shaft and the supporter is held and fixed when the supporter rotates to a first relative position with respect to the first component.

15. The electronic device according to claim 1, wherein the supporter is provided with a second input unit.

16. The electronic device according to claim 1, wherein at least one cavity is provided in the connecting member, the at least one cavity is adapted to accommodate a battery of the electronic device.

17. The electronic device according to claim 16, wherein the battery is a cylindrical battery.

18. The electronic device according to claim 1, wherein at least one first functional component is provided in the first component, the at least one first functional component is arranged at a position close to the first side portion, and the thickness of the first component tapers in the direction from the first side portion to the second side portion.

19. The electronic device according to claim 1, further comprising a fixing unit for fixing or hanging the electronic device.

20. The electronic device according to claim 19, wherein the fixing unit is a hole arranged on the supporter.

21. The electronic device according to claim 1, wherein the bottom of the first groove is at least provided with a second groove, wherein the second groove is adapted to accommodate a smart card for achieving functions of communication or storage, or a stylus.

22. The electronic device according to claim 1, wherein the first component is further provided with a second image capturing unit, the second image capturing unit is arranged at a third side portion of the first component and the second image capturing unit is arranged on the first surface, wherein the third side portion different from the first side portion and the second side portion.

23. The electronic device according to claim 1, wherein the first component is further provided with an audio output unit, the audio output device is arranged at the first side portion and the audio output device is arranged on the first surface.

24. An electronic device comprising:
a first component comprising a display unit, a first side portion and a second side portion, wherein the display unit is arranged on a first surface of the first component, and the second side portion is opposite to the first side portion; and
a second component comprising a connecting member and a supporter, wherein the second component is arranged at the first side portion;
wherein the electronic device has at least a first operation mode and a second operation mode; when the electronic device is in the first operation mode, the electronic device is supported by the supporter and the second side portion; when the electronic device is in a second operation mode, the electronic device is supported by the supporter and the first side portion,
wherein at least one surface of the supporter is a curved surface, the first component has a second surface opposite to the display unit, and the second surface is provided with a groove for accommodating the supporter, the second surface of the first component has at least one curved surface, the curved surface of the supporter matches with the curved surface of the second surface such that when the supporter is accommodated in the groove, the curved surface of the second surface is flush with the curved surface of the supporter and the supporter occupies the entire groove such that the curved surface of the supporter and the curved surface of the second surface cooperate to form an integral curved surface that defines an entirety of a backside of the electronic device; and
wherein the thickness of the first component tapers in a direction from the first side portion to the second side portion; and
wherein the first component is further provided with a first image capturing unit, and the first image capturing unit is arranged at the first side portion and the first image capturing unit is arranged on the second surface.

25. The electronic device according to claim 24, wherein the electronic device further has a third operation mode, wherein the third operation mode is different from the first operation mode and the second operation mode, and when the electronic device is in the third operation mode, the electronic device is supported by the first side portion and the second side portion.

* * * * *